United States Patent
Sauerwald

(10) Patent No.: US 8,882,417 B2
(45) Date of Patent: Nov. 11, 2014

(54) DEVICE PROVIDING ADDITIONAL ATTACHMENT POINTS IN A VEHICLE BED

(75) Inventor: Kevin Scott Sauerwald, Harleysville, PA (US)

(73) Assignee: Skellen Enterprises, LLC, Harleysville, PA (US)

( * ) Notice: Subject to any disclaimer, the term of this patent is extended or adjusted under 35 U.S.C. 154(b) by 0 days.

(21) Appl. No.: 13/568,063

(22) Filed: Aug. 6, 2012

(65) Prior Publication Data

US 2013/0034401 A1 Feb. 7, 2013

Related U.S. Application Data

(60) Provisional application No. 61/515,146, filed on Aug. 4, 2011.

(51) Int. Cl.
B60P 7/08 (2006.01)

(52) U.S. Cl.
CPC ............ B60P 7/0876 (2013.01); B60P 7/0823 (2013.01)
USPC ............ 410/100; 410/97; 410/115; 410/116; 410/118

(58) Field of Classification Search
USPC ............ 410/96, 97, 100, 106, 110, 116, 118, 410/115; 24/301, 302; 248/499
See application file for complete search history.

(56) References Cited

U.S. PATENT DOCUMENTS

| | | | |
|---|---|---|---|
| 2,372,967 A * | 4/1945 | Martin | 410/97 |
| 4,096,807 A | 6/1978 | Woodward | |
| 4,850,769 A | 7/1989 | Matthews | |
| 5,452,973 A | 9/1995 | Arvin | |
| 5,800,106 A | 9/1998 | Miller | |
| 5,876,167 A | 3/1999 | Selby | |
| 5,915,900 A | 6/1999 | Boltz | |
| 6,017,174 A | 1/2000 | Ross et al. | |
| 6,039,521 A | 3/2000 | Sullivan | |
| 6,152,664 A | 11/2000 | Dew et al. | |
| 6,783,311 B2 | 8/2004 | Sauerwald | |
| 6,808,346 B2 * | 10/2004 | Zhan et al. | 410/100 |
| 7,390,155 B1 * | 6/2008 | Diaz et al. | 410/107 |
| 7,901,168 B2 * | 3/2011 | Fa-Kouri | 410/23 |
| 8,272,821 B2 | 9/2012 | Digman | |
| 2001/0046424 A1 | 11/2001 | McDonald | |
| 2002/0006317 A1 | 1/2002 | Hofmann et al. | |
| 2011/0211930 A1 | 9/2011 | Digman | |

* cited by examiner

*Primary Examiner* — Stephen Gordon
(74) *Attorney, Agent, or Firm* — Assouline & Berlowe, PA; Loren Donald Pearson

(57) ABSTRACT

A strap provides additional connection points in a vehicle bed to tethers at more convenient locations than OEM anchor points. The strap includes a ring or series of rings that are connected by webbing segments. A tensioning device is included in the strap to adjust the length of the strap and to provide tension when installed. Two straps can be used along the lateral sides of a pickup-truck bed. Tether such as bungee chords, ropes, straps, or cargo nets can be placed from one strap to another to secure cargo in the bed in ways that are not possible when using the OEM anchor points alone.

10 Claims, 5 Drawing Sheets

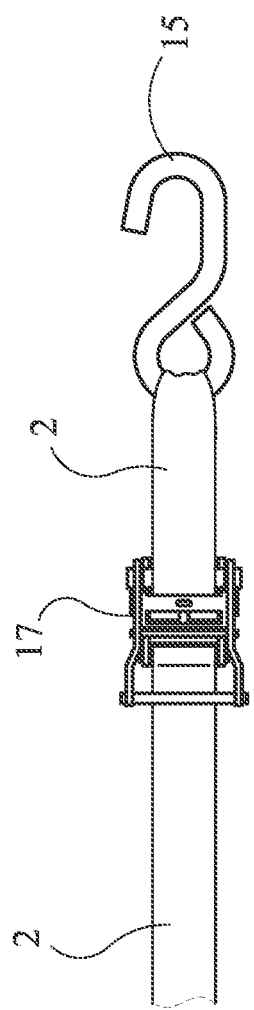
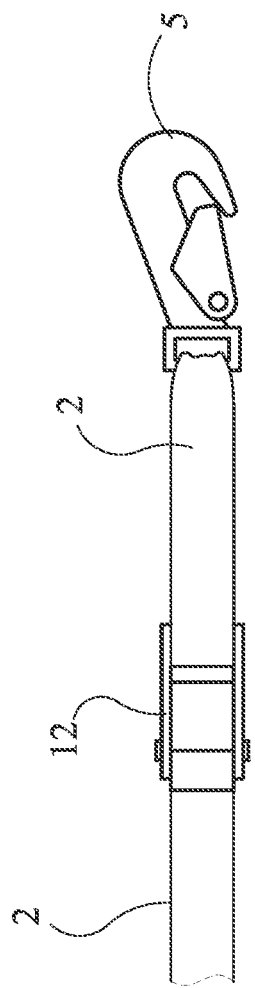
FIG. 5A
FIG. 5B

DEVICE PROVIDING ADDITIONAL ATTACHMENT POINTS IN A VEHICLE BED

CROSS-REFERENCE TO RELATED APPLICATIONS

This application claims the benefit of U.S. Provisional Application No. 61/515,146, filed Aug. 4, 2011. Application No. 61/515,146 is hereby incorporated by reference under 37 CFR 1.78.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to devices for securing cargo and in particular to devices for securing cargo in pickup-truck beds.

2. Description of the Related Art

Vehicles such as pickup trucks and station wagons are designed for carrying cargo. If the cargo moves during transport, the cargo and/or the vehicle can become damaged.

To prevent shifting, vehicle manufacturers provide tie-down anchors in the cargo space (i.e. the pickup truck bed) for attaching bungee chords and cargo nets directly to them. Generally, the number of tie-down anchors is limited and does not allow for proper and complete securing of items. In particular, smaller items that do not fill the cargo space may be impossible to secure when using bungee chords attached directly to the existing tie down anchors.

U.S. Pat. No. 6,783,311 shows a device for securing cargo. The patent has an identical inventor with the instant application.

BRIEF SUMMARY OF THE INVENTION

The invention encompasses a device that creates new attachment points for straps, rope, and bungee cords for securing cargo in a vehicle bed such as a pickup-truck bed, trailer, or station-wagon trunk.

The device is made of segments of strap. Attachment points such as rings interconnect the segments. The straps are made of nylon or polyester webbing material. The segments have various lengths, for example, six inch, eight inch, or twelve inch segments. At a leading end of the strap, a cam buckle with a snap hook is included. The snap hook attaches to an anchor point of the vehicle. The anchor point can be an existing anchor point or installed in the vehicle.

The amount of distance that the cam buckle can tighten is preferably at least as much as the largest spacing between two adjacent O-rings.

To install the device, the snap hook is attached to a first anchor point. Next, the first further O-ring along the length of the device is attached to a second anchor point. Then, the cam buckle or ratchet buckle is used to tighten the device.

Once installed, the device provides additional attachment points along the strap at the various O-rings. For example, a vehicle with four tie-down points can be increased to eight (8), ten (10), or twelve (12), or more, depending on the size of the bed. The added number of attachment points makes securing cargo quicker and easier, and ultimately safer.

Other features of the invention are set forth in the appended claims.

Although the invention is illustrated and described herein as embodied in a device providing additional attachment points in a vehicle bed, the invention is not limited to the details shown because various modifications and structural changes may be made without departing from the invention and the equivalents of the claims. However, the construction and method of operation of the invention together with additional objects and advantages thereof will be best understood from the following description of specific embodiments when read in connection with the accompanying drawings.

BRIEF DESCRIPTION OF THE SEVERAL VIEWS OF THE DRAWING

FIG. 5A is a top side partial view of an embodiment of a strap having a ratchet assembly and eye hook.

FIG. 5B is a top side partial view of an embodiment of a strap having a cam buckle and a snap hook.

DETAILED DESCRIPTION OF THE INVENTION

Figure 1:
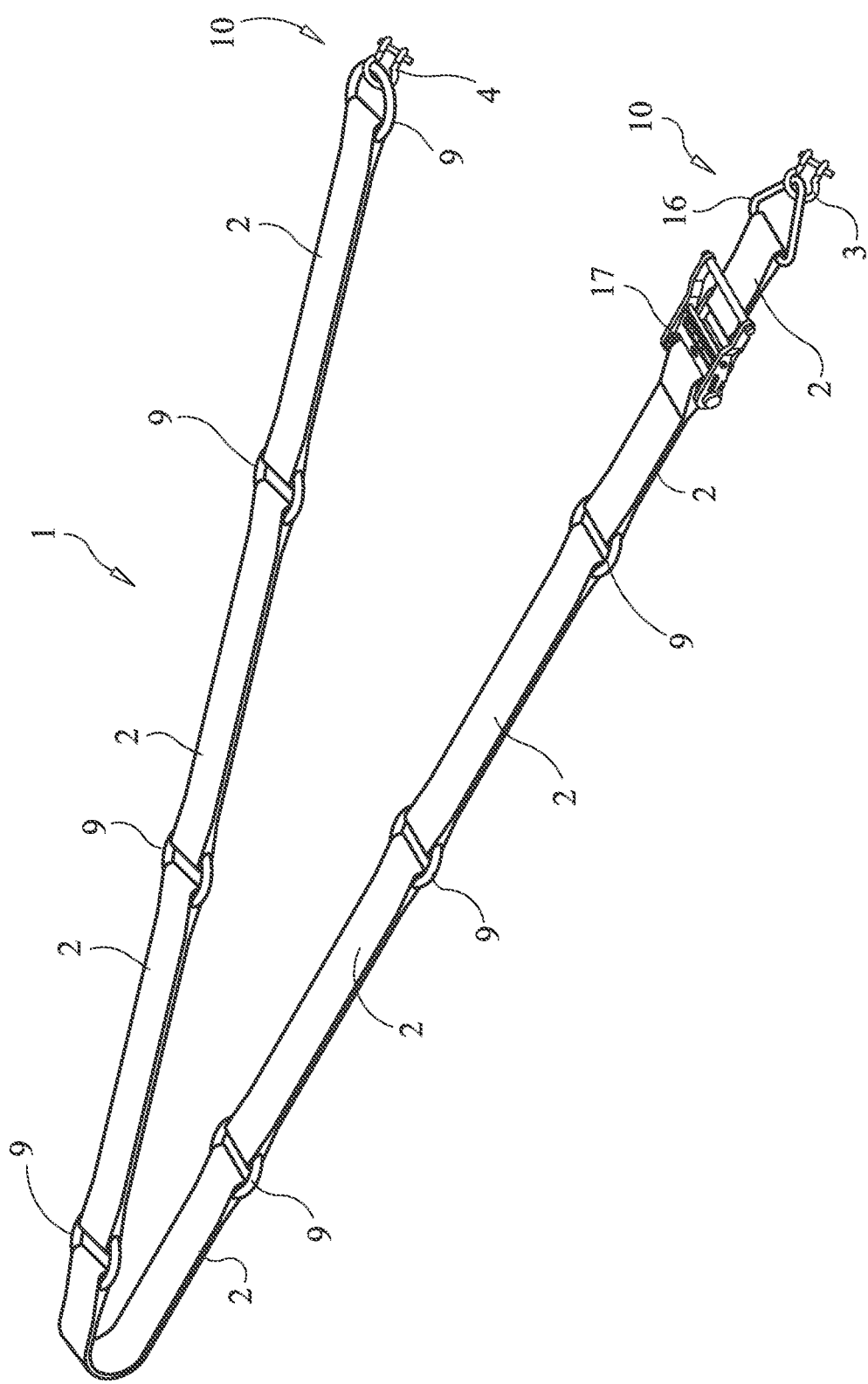
FIG. 1 is a diagrammatic, perspective view of a strap according to the invention.

Embodiments of the invention are described below and are shown in the figures of the drawing.

Figure 2:
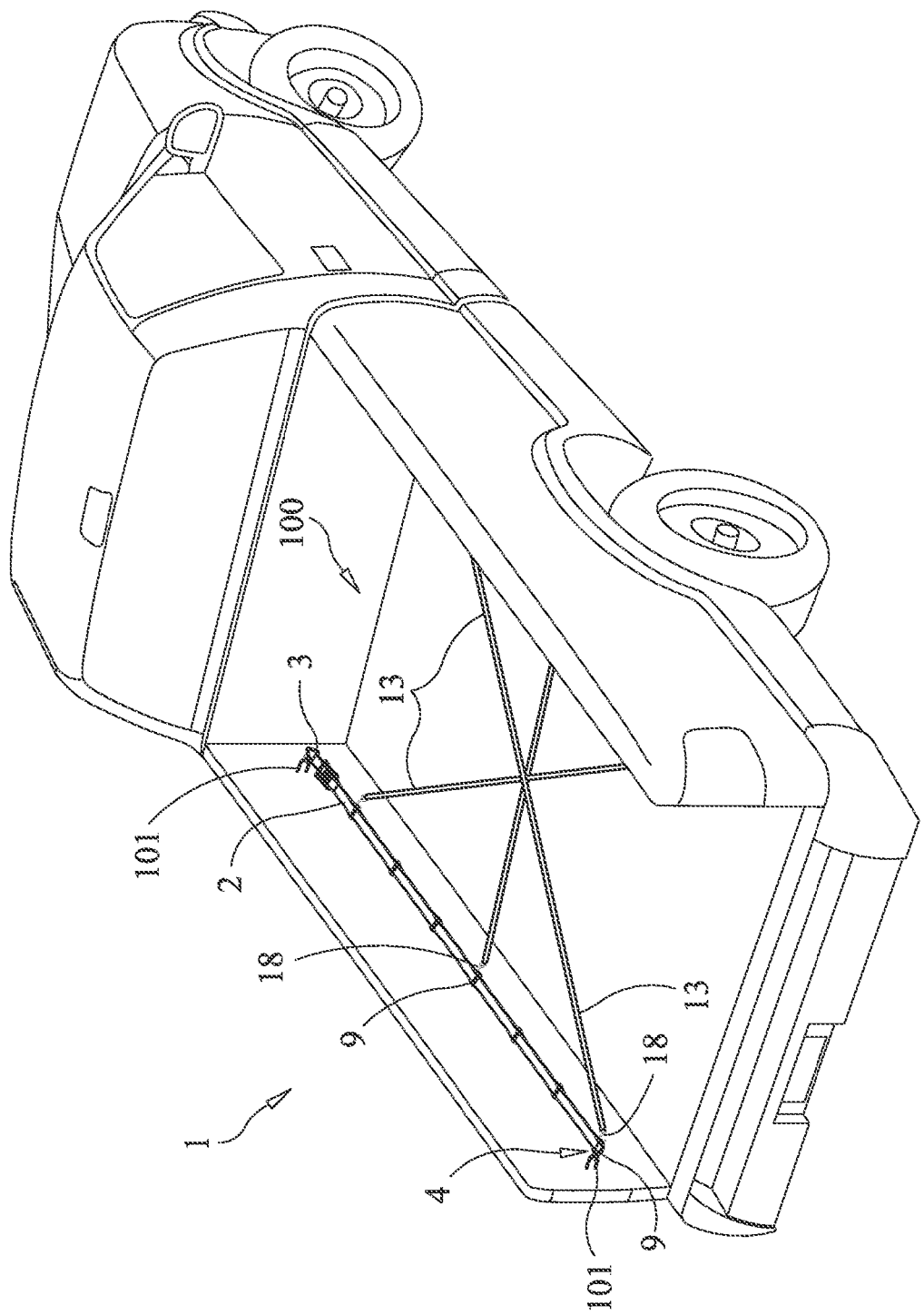
FIG. 2 is a diagrammatic, perspective view of the strap shown in FIG. 1 when installed within an empty vehicle bed.
Figure 3:
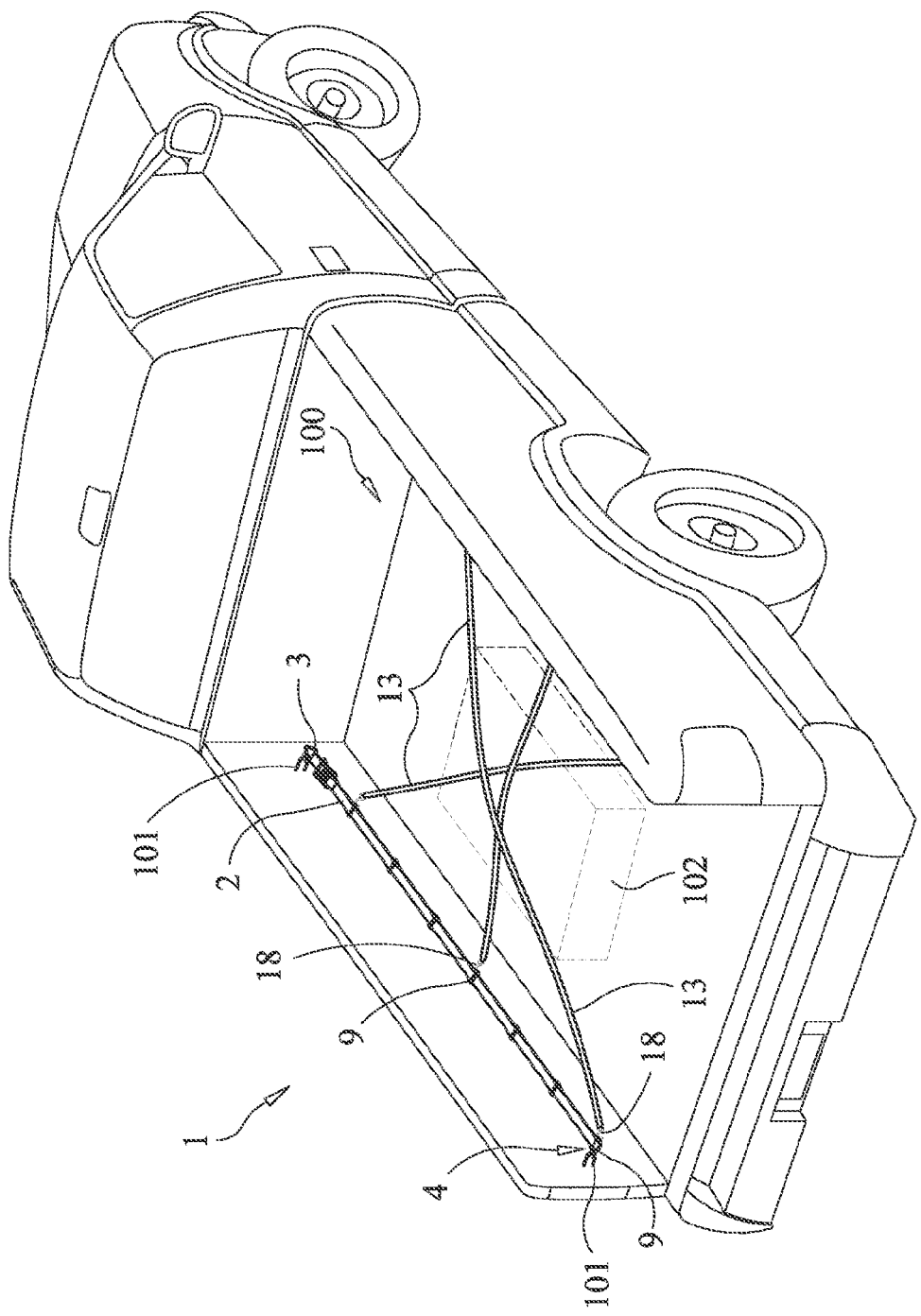
FIG. 3 is a diagrammatic, perspective view of the strap shown in FIG. 1 when installed within a vehicle bed where the strap is securing cargo.

FIGS. 2-3 show a portion of a strap 1 installed in a pickup-truck bed 100.

The pickup-truck bed 100 has a U-shaped anchor 101 bolted to each corner of the pickup-truck bed 100.

The strap 1 includes a plurality of webbing segments 2. Each webbing segment 2 is formed from a length of webbing. Each end of the webbing is folded back over itself and stitched to itself to define a loop. Each webbing segment 2 has two ends. An O-ring 9 is secured within the loop. The webbing segment 2 is preferably formed from polyester fibers. Nylon is an alternative material for forming the webbing segment 2. Other preferred embodiments of webbing, which are not shown, include rope or other webbing strap material.

The strap 1 has a leading end 3 and an opposing, trailing end 4. In the preferred embodiment that is shown in FIG. 1, each end 3 and 4 has a shackle 10. The shackles 10 are used to connect the strap 1 to the U-shaped anchors 101 within the pickup-truck bed 100.

In the preferred embodiment shown in FIG. 1, an O-Ring 9 interconnects each adjacent pair of web segments 2. The O-ring 9 provides an attachment point for a tether. A preferred material for the O-rings 9 is steel. O-rings 9 are placed along the length of the strap 1. The O-rings are preferably spaced at an interval along the strap 1. The O-ring 9 can be made of plastic. Alternative embodiments, which are not shown, can use different shaped rings: for example, D-rings, square rings, a loop in the fabric, a grommet, or other means for attachment.

In the leading end 3, a ratchet assembly 17 is attached to two webbing segments 2. A proximal one of the two webbing segments 2 is attached to an O-ring 9. A triangle hook 16 is attached to a distal one of the two webbing segments 2. A shackle 10 is attached to the triangle hook 16.

In the trailing end 4, an O-ring 9 is attached to the terminal webbing segment 2. A shackle 10 is attached to the O-ring 9.

The length of the strap 1 when in a relaxed position (i.e. unratcheted) should be at least as long as a vehicle bed. Pick-up truck beds 100 are typically between 2.0 and 2.4 meters. Other sizes are possible for different types of vehicles. The ratchet assembly 17 is used to tighten the strap 1.

FIG. 3 shows the strap 1 installed within a vehicle bed 100. The vehicle bed 100 has four U-hooks 101. Each U-hook 101 is connected to a respective corner of the bed 100. The U-hooks are typically placed in the bed by original equipment manufacturer (i.e. the truck manufacturer).

To install the strap 1, the ratchet assembly 17 is opened to extend the length of the strap 1 to at least as long as the distance between two U-shaped anchors 101. Typically, a pair of straps 1 is connected to the sides of the bed 100 by running each longitudinally along the left and right sides of the bed. The shackle 10 on the leading end 3 of the strap 1 is connected to a first of the U-shaped anchors 101. The shackle 10 on the trailing end 4 of the strap 1 is connected to a second of the U-shaped anchors 101. Next, the ratchet assembly 17 is used to tension the strap 1 between the U-shaped anchors 101.

To use the strap 1, a tether is connected to an O-ring 9 of the strap 1. Preferably, the tether is stretched across the bed 100 and attached to an O-ring of a second strap 1 disposed on the opposing side of the bed 100. Examples of tethers are bungee cords 13, straps (which are not shown), rope (which is not shown), or a cargo net 20 (which is shown in FIG. 4).

In the embodiment shown in FIG. 3, bungee cords 13 are used as the tethers. The bungee cords 13 terminate in hooks 18. The hooks are connected to the O-rings 9 of the strap 1. The bungee cords are arranged to secure cargo 102 within the bed 100.

Figure 4:
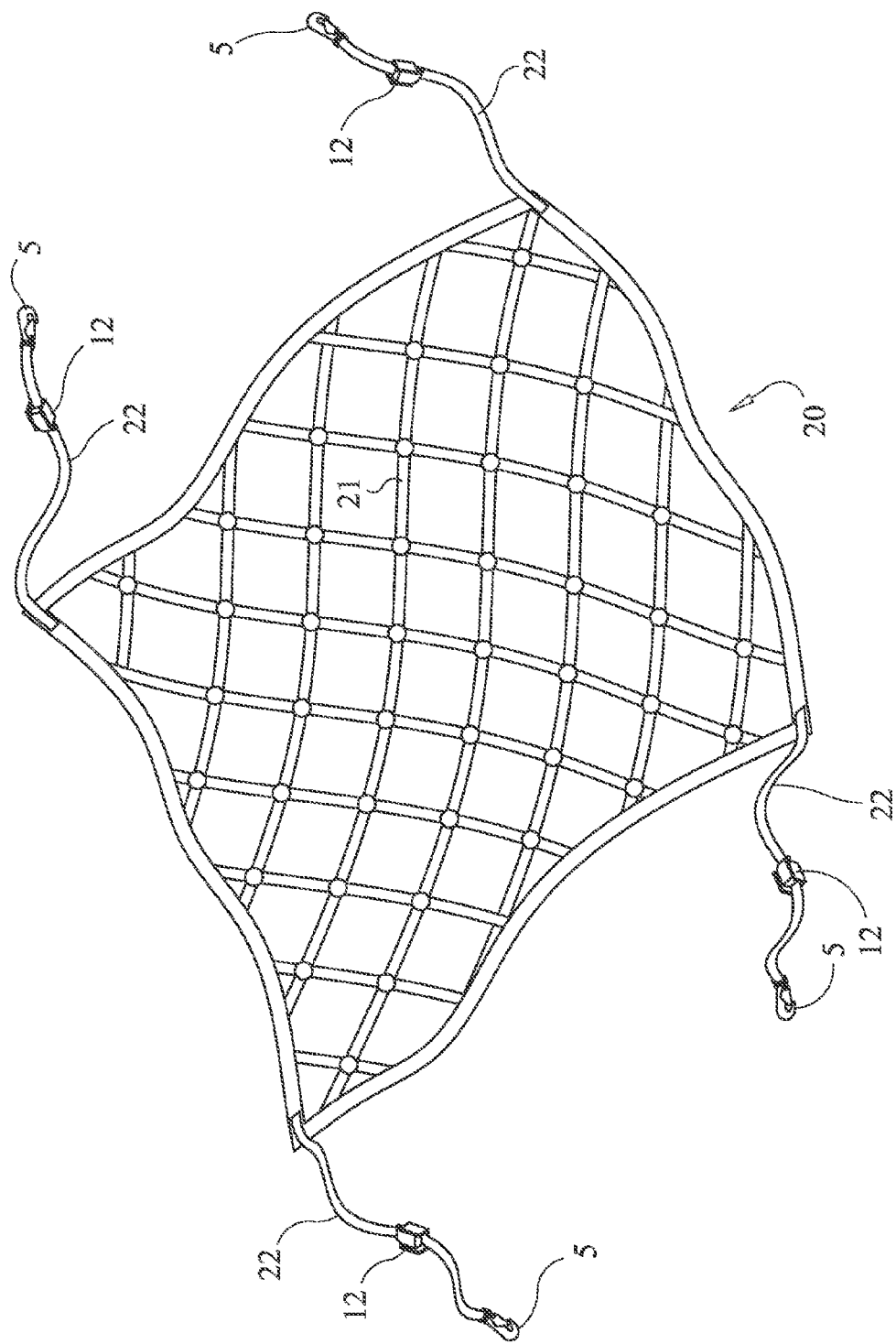
FIG. 4 is a diagrammatic, perspective view of a cargo net according to the invention.

FIG. 4 shows a cargo net 20. The cargo net includes a rectangular net 21. A tether strap 22 is connected to each corner of the net 21. The straps terminate with a snap hook 5. A cam buckle 12 is placed on each tether strap. The snap hooks 5 are used to connect the cargo net 20 to respective O-rings 9 on the straps 1. Once attached to the O-rings 9, the cam buckles 12 are used to tension the cargo net 1 between the straps 1.

FIG. 5A shows a first alternate embodiment of a strap 1. A ratchet assembly 17 is still used as a means for tensioning the strap 1. However, instead of a shackle 10, an eye hook 15 is used to terminate the strap 1. The eye hook 15 is used to connect the strap 1 to the U-shaped anchor 101.

FIG. 5B shows a second alternate embodiment of a strap 1. Instead of using a ratchet assembly 17, a cam buckle 12 is used as a means for tensioning the strap 1. A snap hook 5 replaces the shackle 10. The snap hook 5 is used to connect the strap 1 to the U-shaped anchor 101.

The various tensioning devices and connectors can be combined and mixed as needed.

Unless otherwise mentioned the reference numbers are used consistently throughout the figures.

What is claimed is:

1. A strap assembly, comprising:
   a first strap for providing additional attachment points in a vehicle bed, including:
   a first webbing segment having a first end and a second end;
   a second webbing segment having a first end and a second end;
   a ring for attaching to a tether, said ring being attached to said first end of said first webbing segment and being attached to said second end of said second webbing segment;
   a first connector for attachment to a first anchor, said first connector being connected to said second end of said first webbing segment; and
   a second connector for attachment to a second anchor, said second connector being connected to said first end of said second webbing segment; and
   a second strap for providing additional attachment points in a vehicle bed, including:
   a first webbing segment having a first end and a second end;
   a second webbing segment having a first end and a second end;
   a ring for attaching to a tether, said second strap ring being attached to said first end said second strap ring webbing segment and being attached to said second end of said second strap second webbing segment;
   a first connector for attachment to a third anchor, said second strap first connector being connected to said second end of said second strap first webbing segment; and
   a second connector for attachment to a fourth anchor, said second strap second connector being connected to said first end of said second strap second webbing segment; and
   a bungee cord interconnecting said ring of said first strap and said ring of said second strap.

2. The strap according to claim 1, wherein at least one of said first webbing segment and said second webbing segment on at least one of said first strap and said second strap is made from polyester fibers.

3. The strap according to claim 1, wherein at least one of said rings is an O-ring.

4. The strap according to claim 1, wherein at least one of said first connectors is a shackle.

5. The strap according to claim 1, further comprising a triangle ring interconnecting at least one of said first webbing segments and at least one of said first connectors.

6. The strap according to claim 1, wherein at least one of said first connectors is an eye hook.

7. The strap according to claim 1, wherein at least one of said first connectors is a snap hook.

8. A strap assembly for providing additional attachment points in a vehicle bed, comprising:
   a first strap including:
   a first webbing segment having a first end and a second end;
   a second webbing segment having a first end and a second end;
   a ring for attaching to a tether, said ring being attached to said first end of said first webbing segment and being attached to said second end of said second webbing segment;
   a first connector for attachment to a first anchor, said first connector being connected to said second end of said first webbing segment;
   a third webbing segment having a first end and a second end;
   a tensioning device interconnecting said first end of said second webbing segment and said second end of said third webbing segment, said tensioning device adjusting a length of the strap; and a second connector for attachment to a second anchor, said second connector being connected to said first end of said third webbing segment;

a second strap including:

a first webbing segment having a first end and a second end;

a second webbing segment having a first end and a second end;

a ring for attaching to a tether, said second strap ring being attached to said first end of said second strap first webbing segment and being attached to said second end of said second strap second webbing segment;

a first connector for attachment to a first anchor, said second strap first connector being connected to said second end of said second strap first webbing segment;

a third webbing segment having a first end and a second end;

a tensioning device interconnecting said first end of said second strap second webbing segment and said second end of said second strap third webbing segment, said tensioning device adjusting a length of the second strap; and a second connector for attachment to a second anchor, said second strap second connector being connected to said first end of said second strap third webbing segment; and a bungee cord interconnecting said ring of said first strap and said ring of said second strap.

9. The strap assembly according to claim 8, wherein said tensioning device on at least one of said first strap and said second strap is a cam buckle.

10. The strap assembly according to claim 8, wherein said tensioning device on at least one of said first strap and said second strap is a ratchet assembly.

\* \* \* \* \*